(12) United States Patent
Shirk et al.

(10) Patent No.: US 6,227,562 B1
(45) Date of Patent: May 8, 2001

(54) STORED GAS INFLATOR ASSEMBLY

(75) Inventors: Bryan W. Shirk, Mesa; Jess A. Cuevas, Scottsdale; Ahmad K. Al-Amin, Higley; Timothy A. Swann; Roy D. Van Wynsberghe, both of Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/259,362

(22) Filed: Feb. 26, 1999

(51) Int. Cl.[7] .............................. B60R 21/22; B60R 21/26
(52) U.S. Cl. .................. 280/730.2; 280/737; 137/68.13; 137/71
(58) Field of Search .................................. 280/737, 736, 280/740, 741, 742, 730.2; 138/68.13, 71

(56) References Cited

U.S. PATENT DOCUMENTS

| | | |
|---|---|---|
| 3,724,870 | 4/1973 | Kurokawa et al. . |
| 3,884,497 | 5/1975 | Massengill et al. . |
| 5,593,180 | 1/1997 | Cuevas et al. . |
| 5,618,057 * | 4/1997 | Johnson et al. ...................... 280/736 |
| 5,709,406 * | 1/1998 | Buchanan .............................. 280/737 |
| 5,794,973 * | 8/1998 | O'Loughlin et al. ................ 280/737 |
| 5,863,066 * | 1/1999 | Blumenthal ........................... 280/737 |
| 5,907,120 * | 5/1999 | Mooney et al. ....................... 280/737 |
| 5,967,550 | 10/1999 | Shirk et al. . |
| 5,984,348 * | 11/1999 | Specht et al. ....................... 280/730.2 |
| 6,010,152 * | 1/2000 | Swann et al. ......................... 280/736 |
| 6,056,316 * | 5/2000 | Yamaji et al. ...................... 280/730.2 |
| 6,073,961 * | 6/2000 | Bailey et al. ...................... 280/730.2 |

\* cited by examiner

*Primary Examiner*—Peter C. English
(74) *Attorney, Agent, or Firm*—Tarolli, Sundheim, Covell, Tummino & Szabo L.L.P.

(57) ABSTRACT

A safety apparatus (12) for helping to protect an occupant of a vehicle having a side structure (16) comprises an inflatable protection device (14) having an inflated condition disposed between the vehicle occupant and the side structure. The safety apparatus (12) also comprises an inflator assembly (10) for inflating the protection device (14) and for maintaining the protection device in the inflated condition for at least five seconds. The inflator assembly (10) includes at least one container (30) having gas (52) stored under pressure. In a preferred embodiment, the inflator assembly (10) comprises a primary outlet passage (70) connected with the container for releasing inflation fluid (52) from the inflator assembly at a relatively high rate over a relatively short period of time. The inflator assembly (10) also preferably has a secondary outlet passage (90) connected with the container for releasing inflation fluid from the inflator assembly at a relatively low rate for about five to ten seconds.

32 Claims, 3 Drawing Sheets

STORED GAS INFLATOR ASSEMBLY

BACKGROUND OF THE INVENTION

1. Technical Field

The present invention relates to a vehicle safety apparatus and, in particular, to an inflator for an inflatable vehicle occupant protection device, such as a side curtain, which remains inflated for an extended period of time.

2. Description of the Prior Art

It is known to inflate a vehicle occupant protection device, such as an air bag, to help protect a vehicle occupant. The protection device is inflated by inflation fluid from an inflator. One type of protection device is a side curtain. The side curtain is inflatable into a position between the vehicle occupant and the vehicle side structure to help protect the vehicle occupant in the event of a side impact to the vehicle.

It is known to tailor the output pressure of an inflator, in order to inflate an air bag or side curtain in a predetermined manner over a period of time. For example, it is known to inflate a side curtain initially with inflation fluid at a relatively high pressure and flow rate, then to maintain the side curtain inflated for an extended period of time with a continued flow of inflation fluid at a relatively low rate. Known inflators which can effect such an extended inflation of a side curtain use one or more ignitable pyrotechnic charges which can burn for an extended period of time.

SUMMARY OF THE INVENTION

The present invention is a vehicle occupant safety apparatus for helping to protect an occupant of a vehicle having a side structure in the event of a side impact to the vehicle. The safety apparatus comprises an inflatable vehicle occupant protection device having a deflated condition and having an inflated condition in which the protection device is inflated between the vehicle occupant and the vehicle side structure. The safety apparatus also comprises an inflator assembly for inflating the protection device and for maintaining the protection device in an inflated condition for at least five seconds. The inflator assembly includes at least one container having gas stored under pressure.

In a preferred embodiment, the inflator assembly comprises container means for containing inflation fluid under pressure. The container means has at least one openable portion for releasing inflation fluid to flow out of the container means. The inflator assembly also includes first output means connected with the container for releasing inflation fluid from the inflator assembly at a relatively high rate over a relatively short period of time. The inflator assembly further includes second output means connected with the container for releasing inflation fluid from the inflator at a relatively low rate for about five to ten seconds.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
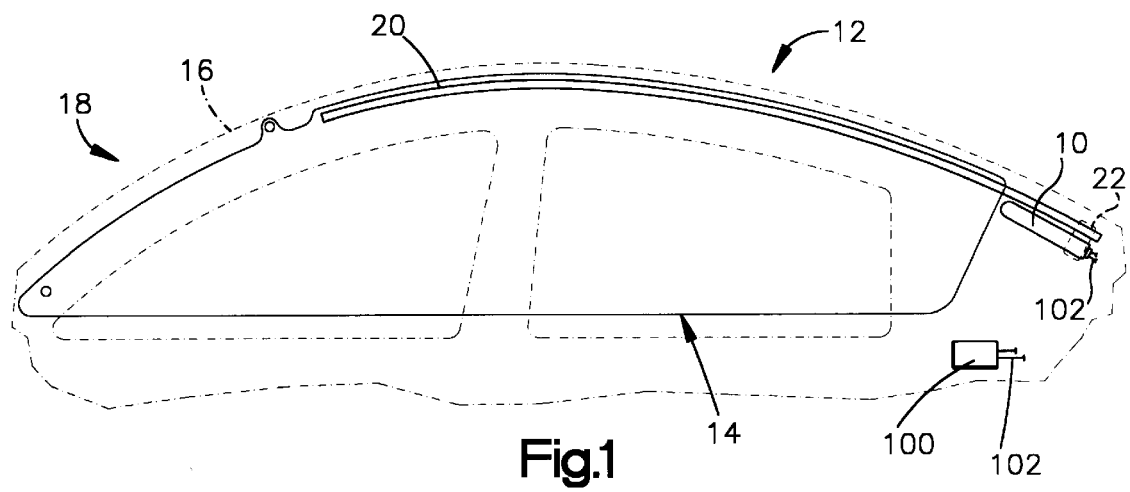
FIG. 1 is a schematic view of a vehicle safety apparatus including an inflator assembly in accordance with a first embodiment of the present invention.

The present invention relates to a vehicle safety apparatus and, in particular, to an inflator assembly for an inflatable vehicle occupant protection device, such as an air bag. The present invention is applicable to various inflator assembly constructions. As representative of the present invention, FIG. 1 illustrates an inflator assembly 10 which forms a part of a vehicle safety apparatus 12.

The safety apparatus 12 includes an inflatable vehicle occupant protection device in the form of a side curtain 14. The side curtain 14 is mounted adjacent the side structure 16 of a vehicle 18, including side windows, by a support structure indicated schematically at 20, which may comprise a fill tube. The safety apparatus 12 also includes a conduit indicated schematically at 22 for directing inflation fluid from the inflator assembly 10 to the side curtain 14. The side curtain 14 is movable upon actuation of the inflator assembly 10 from a deflated and stowed condition (not shown) to an inflated condition as illustrated in FIG. 1, to help to protect occupants of the vehicle 18 in the event of a side impact to the vehicle.

The inflator assembly 10 (FIG. 2) includes a primary container or housing 30 having a generally elongate configuration. The primary container 30 includes a main body portion 32 and an end cap 34. The end cap 34 is secured to the open end of the main body portion 32 by a friction weld, but could alternatively be secured by other known methods, such as laser welding, brazing, or screw threads.

The main body portion 32 of the primary container 30 has a tubular, cylindrical configuration including an axially extending, cylindrical side wall 40 centered on a longitudinal central axis 44 of the inflator assembly 10. The main body portion 32 also includes a domed end wall 46.

The main body portion 32 and the end cap 34 define a gas storage chamber 50 in the primary container 30. The gas storage chamber 50 contains a quantity of inflation fluid 52 in the form of compressed gas. A rupturable burst disk 54 is secured to the end cap 34 and blocks flow of inflation fluid 52 out of the gas storage chamber 50. The inflator assembly 10 is free of pyrotechnic material for generating gas for inflating the side curtain; only the inflation fluid 52 is used to inflate the side curtain.

The end cap 34 of the primary container 30 has a generally cylindrical configuration including a cylindrical side wall 60 and an end portion 62 spaced from the gas storage chamber 50. The side wall 60 has a cylindrical outer surface 64. The end cap 34 has a central chamber 66. An electrically actuatable initiator 68 of a known configuration is mounted on the end portion 62 of the end cap 34 and projects into the central chamber 66 of the end cap.

Figure 2:
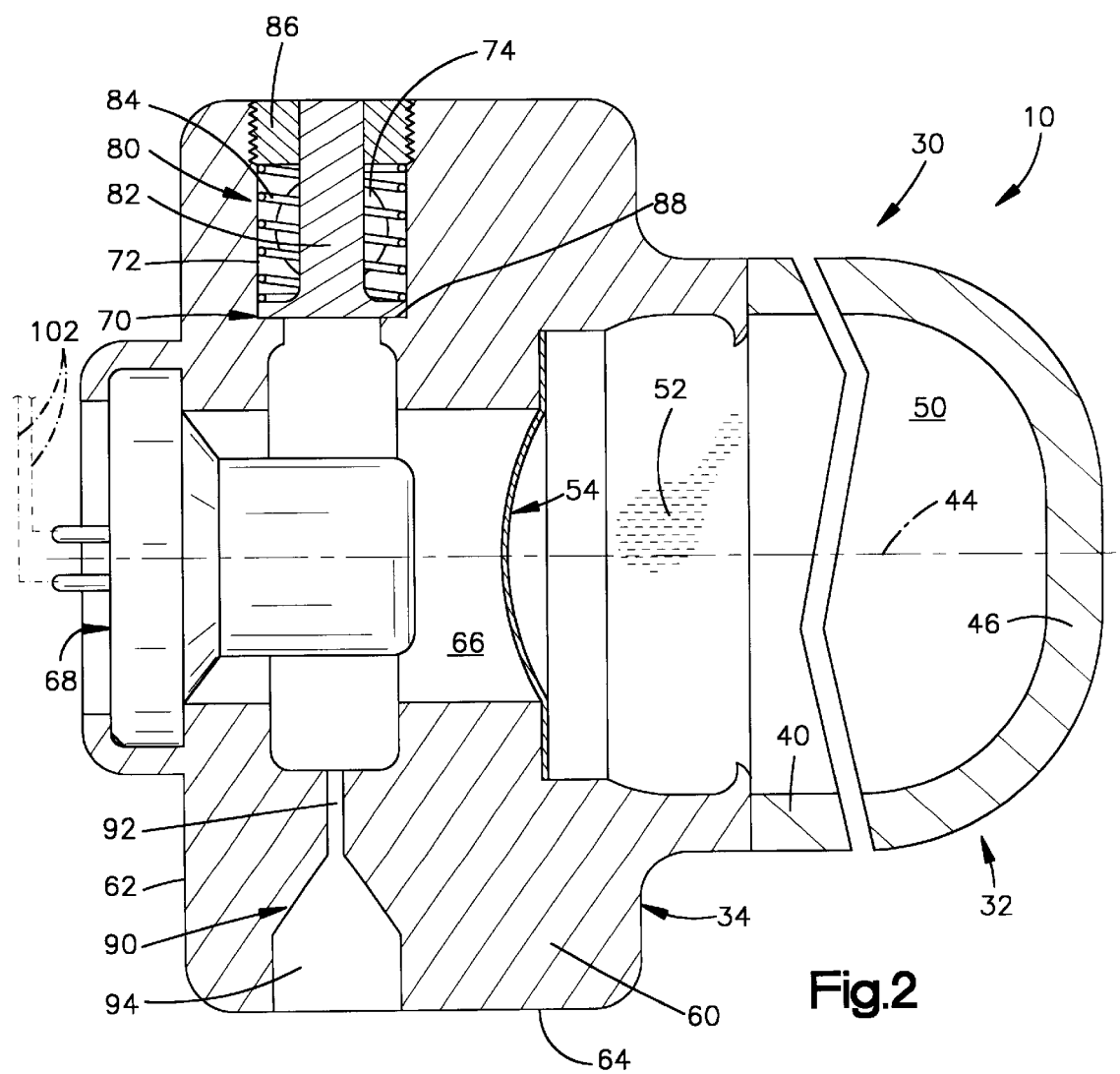
FIG. 2 is a longitudinal sectional view of the inflator assembly of FIG. 1.

The inflator assembly 10 includes a primary inflation fluid outlet passage 70 and a secondary or makeup inflation fluid outlet passage 90 for enabling flow of inflation fluid 52 from the central chamber 66 of the end cap 34 to the side curtain 14. The primary outlet passage 70 has a first portion 72 which extends radially from the central chamber 66 to the outer surface 64 of the side wall 60 of the end cap 34. A second portion 74 of the primary outlet passage 70 extends perpendicularly from the first portion 72 to the outer surface 64. The second portion 74 extends in a direction into the plane of the paper as viewed in FIG. 2; only its circular inlet is shown in FIG. 2.

A valve 80 is disposed in the first portion 72 of the primary outlet passage 70. The valve 80 includes a valve member 82, a spring 84, and a retainer 86. The retainer 86 is screwed into the end cap 34 at one end of the first portion 72 of the outlet passage 70. The spring 84 extends between the retainer 86 and the valve member 82. The spring 84 biases the valve member 82 into a closed position against a valve seat 88 formed on the end cap 34 adjacent the other end of the first portion 72 of the outlet passage 70. In other words, the valve member 82 is biased in a downward direction as viewed in FIG. 2.

The valve member 82 is exposed to the fluid pressure in the central chamber 66 of the end cap 34. When the valve member 82 is in the closed position, the valve 80 is in a closed condition blocking fluid flow from the central chamber 66 of the end cap 34 to the second portion 74 of the primary outlet passage 70.

The makeup outlet passage 90 is a continuously open passage which extends between the central chamber 66 and the outer side surface 64 of the end cap 34. A radially inner first portion 92 of the makeup outlet passage 90 has a narrow, cylindrical configuration. A second portion 94 of the makeup outlet passage 90 extends radially outward from the first portion 92. The second portion 94 flares outwardly and has a larger flow area than the first portion 92.

The first portion 92 of the makeup outlet passage 90 has a relatively small flow area and thus significantly restricts fluid flow through the makeup outlet passage. The primary outlet passage 70, in comparison, has a relatively large flow area.

The vehicle 18 includes known means indicated schematically at 100 (FIG. 1) for sensing a collision involving the vehicle and for actuating the inflator assembly 10 in response to the sensing of a collision. The means 100 may include a sensor and vehicle electric circuitry for actuating the inflator assembly 10 in response to sensing a vehicle acceleration or deceleration indicative of a vehicle collision having a severity greater than a predetermined threshold value. As discussed below, the means 100 provides an electric signal over lead wires 102 to the inflator assembly 10, when the inflator assembly is to be actuated.

In the event of an impact to the vehicle 18 of a magnitude greater than the predetermined threshold value, the sensing means 100 provides an electrical signal over the lead wires 102 to the inflator assembly 10. The initiator 68 is actuated in a known manner to rupture the burst disk 54. Inflation fluid 52 flows out of the gas storage chamber 50 and into the central chamber 66 in the end cap 34.

Inflation fluid 52 immediately begins to flow out of the inflator assembly 10 through the makeup outlet passage 90, which is always open. Inflation fluid flows through the primary outlet passage 70 only when the valve opens. Specifically, upon rupturing of the burst disk 54, the fluid pressure in the central chamber 66 of the end cap 34, which acts on the valve member 82, increases rapidly until it overcomes the biasing effect of the valve spring 84. The valve member 82 moves off the valve seat 88, in an upward direction as viewed in FIG. 2.

When the valve member 82 moves far enough, the second portion 74 of the primary outlet passage 70 is connected in fluid communication with the central chamber 66 of the end cap 34. Inflation fluid 52 flows out of the end cap 34 through the first and second portions 72 and 74 of the primary outlet passage 70. Because of the relatively large flow area of the primary outlet passage 70, the inflation fluid 52 flows through the primary outlet passage at a relatively high rate.

The flow of inflation fluid 52 through the primary outlet passage 70 lasts only as long as the fluid pressure in the central chamber 66 of the end cap 34 is sufficient to keep the valve 80 open. Specifically, as soon as the inflator assembly 10 is actuated and the burst disk 54 is ruptured, the pressure in the gas storage chamber 50 begins to drop. After a relatively short period of time, therefore, the pressure in the central chamber 66 drops to a low enough level that the valve spring 84 closes the valve 80. Flow of inflation fluid 52 through the primary outlet passage 70 ceases. Flow of inflation fluid 52 through the makeup outlet passage 90 continues throughout this time because the makeup outlet passage is continuously open.

The side curtain 14 is inflated quickly because of the relatively high pressure and flow rate of the inflation fluid 52 flowing through the primary outlet passage 70. This flow continues for a relatively short period of time, for example, about twenty milliseconds. This relatively short period of time is long enough to inflate the side curtain to help protect a vehicle occupant in the event of a side impact to the vehicle 18.

After this initial rapid flow of the inflation fluid 52 into the side curtain 14, the inflator assembly 10 continues to supply inflation fluid 52 to the side curtain through the makeup outlet passage 90. This flow is at a relatively slow rate because of the relatively small flow area of the makeup outlet passage 90. The makeup outlet passage 90 discharges inflation fluid 52 only at a rate sufficient to compensate or make up for pressure loss in the side curtain 14 through leakage or cooling. Thus, the fluid pressure in the side curtain 14 can be maintained at a desired relatively constant level, allowing the side curtain to remain filled for occupant protection for five to ten seconds or more, and preferably at least seven seconds. This extended period of time is long enough to help prevent a vehicle occupant from being ejected from the vehicle 18 during a rollover collision.

The flow area of the primary outlet passage 70 is about an order of magnitude greater than the flow area of the makeup outlet passage 90. The actual dimensions and relative sizes of the outlet passages 70 and 90 are dependent on numerous factors, including but not limited to the pressure at which the inflation fluid 52 is stored, the volume of the side curtain 14, the required inflation rate and permeability of the side curtain, the required inflation pressure at first strike, and the required inflation pressure at a later time to prevent occupant ejection during a rollover accident.

Figure 3:
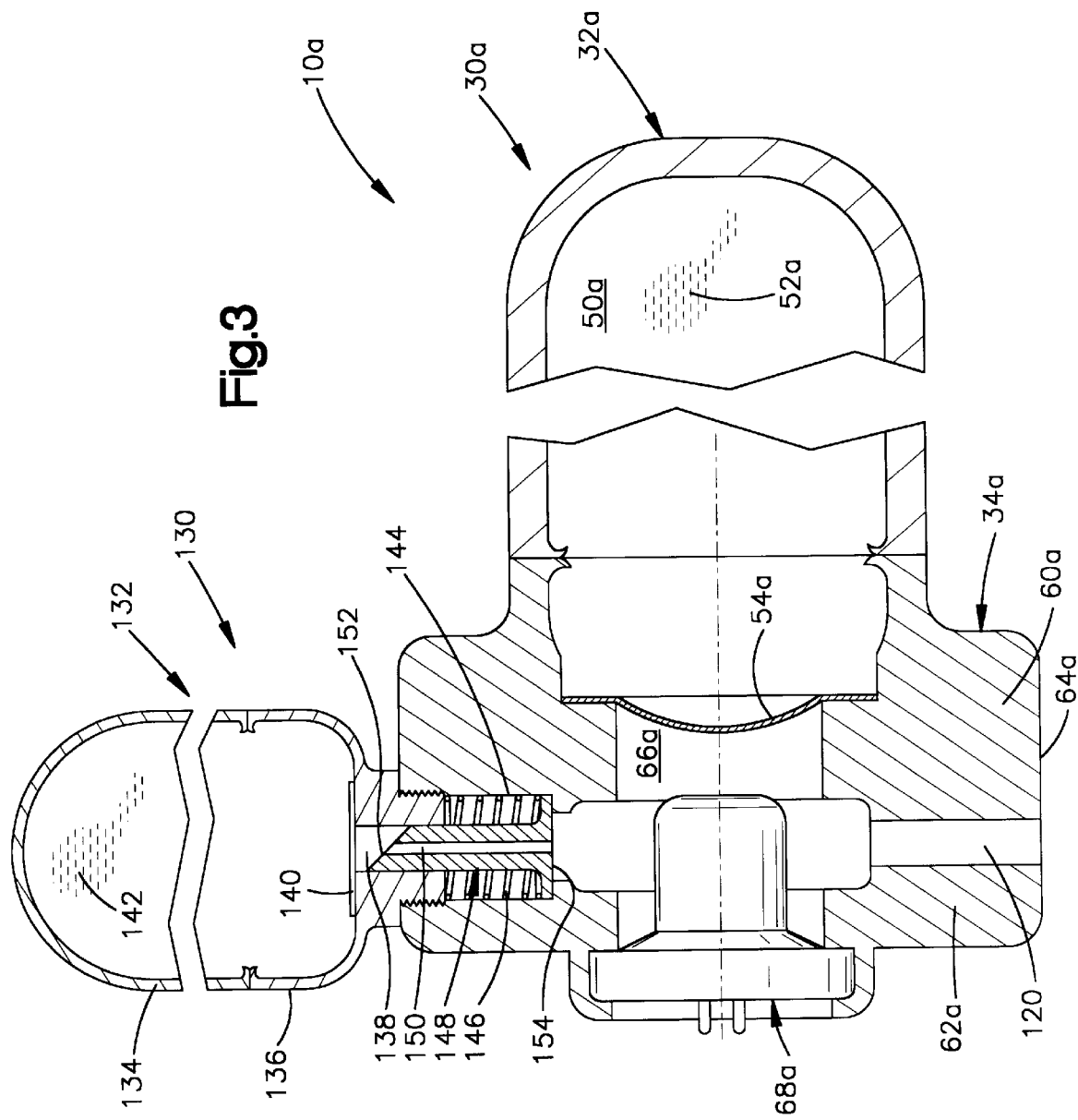
FIG. 3 is a view similar to FIG. 2 of an inflator assembly in accordance with a second embodiment of the present invention.

FIG. 3 illustrates an inflator assembly 10*a* constructed in accordance with a second embodiment of the present invention. The inflator assembly 10*a* is similar in construction to the inflator assembly 10 and can be used to inflate a side curtain (not shown) which is similar to the side curtain 14. Parts in the inflator assembly 10*a* which are similar or identical to the corresponding parts in the inflator assembly 10 are given the same reference numerals with the suffix "a" added for clarity.

The inflator assembly 10*a* includes a primary inflation fluid outlet passage 120 for enabling flow of inflation fluid from the inflator assembly to the side curtain. The primary outlet passage 120 is a continuously open passage which extends between the central chamber 66*a* of the end cap 34*a* and the outer side surface 64*a* of the end cap. The flow area of the primary outlet passage 120 is large enough to fill the side curtain in a relatively short period of time, for example, about 20 milliseconds.

The inflator assembly 10*a* also includes a makeup assembly 130 for providing a relatively slow flow of inflation fluid into the side curtain to compensate or make up for pressure loss in the side curtain over time. The makeup assembly 130 includes a secondary container 132. The secondary container 132 includes a main body portion 134 and an inner end portion 136. The inner end portion 136 has a central opening or passage 138.

A rupturable portion 140 of the secondary container 132, such as a burst disk or foil membrane, is secured to the inner end portion 136 and closes the secondary container. A quantity of inflation fluid 142 under pressure, in the form of gas, is stored in the secondary container 132. The rupturable portion 140 blocks flow of inflation fluid 142 out of the secondary container 132 through the central opening 138 in the inner end portion 136 of the secondary container.

A threaded opening 144 is formed in the side wall 60a of the end cap 34a. The opening 144 extends radially from the central chamber 66a to the outer surface 64a of the side wall 60a of the end cap 34a. The inner end portion 136 of the secondary container 132 is screwed into the opening 144. The inner end portion 136 retains a spring 146 and a needle 148 in the passage 144.

The needle 148 is hollow, having an inflation fluid outlet passage 150 which extends for the entire length of the needle. The needle 148 has a sharpened end portion 152 disposed in the central opening 138 of the inner end portion 136 of the secondary container 132, adjacent the rupturable portion 140 of the secondary container. The needle 148 has an inner end portion 154 exposed to the fluid pressure in the central chamber 66a of the end cap 34a. The spring 146 biases the needle 148, against this fluid pressure, into a position spaced apart from the rupturable portion 140 of the secondary container 132.

Upon actuation of the inflator assembly 10a, the initiator 68a is actuated and ruptures the burst disk 54a. Inflation fluid 52a flows out of the gas storage chamber 50a in the primary container 30a and into the central chamber 66a in the end cap 34a. Inflation fluid 52a immediately begins to flow out of the inflator assembly 10a through the primary outlet passage 120.

The pressure in the gas storage chamber 50a begins to drop as soon as the inflator assembly 10a is actuated and the burst disk 54a is ruptured. After a certain period of time, the pressure in the gas storage chamber 50a is low enough so that the primary container 30a is substantially emptied. Because of the relatively large flow area of the primary outlet passage 120, this typically takes only about twenty milliseconds. The side curtain can thus be inflated quickly because of the relatively high pressure and flow rate of the inflation fluid 52a flowing from the primary container 30a.

In the meantime, the increased pressure in the central chamber 66a, acting on the needle 148, overcomes the biasing effect of the spring 146. The needle 148 moves into engagement with and ruptures the rupturable portion 140 of the secondary container 132. Inflation fluid 142 flows out of the secondary container 132 through the outlet passage 150 in the needle 148 and into the central chamber 66a in the end cap 32a. This inflation fluid 142 mixes with the inflation fluid 52a from the primary container 30a and flows out of the inflator assembly 10a through the primary outlet passage 120.

Because of the relatively small flow area of the outlet passage 150 in the needle 148, inflation fluid 142 is discharged from the secondary container 132 at a relatively low rate. The secondary container 132 discharges fluid 142 only at a rate sufficient to compensate for pressure loss in the side curtain 14 over time through leakage or cooling. The volume and pressure of the inflation fluid 142 are selected to provide this makeup flow for about five to ten seconds. Thus, the fluid pressure in the side curtain 14 can be maintained at a desired relatively constant level, allowing the side curtain to remain filled for occupant protection for an extended period of time, in the range of from five to ten seconds or more.

Figure 4:
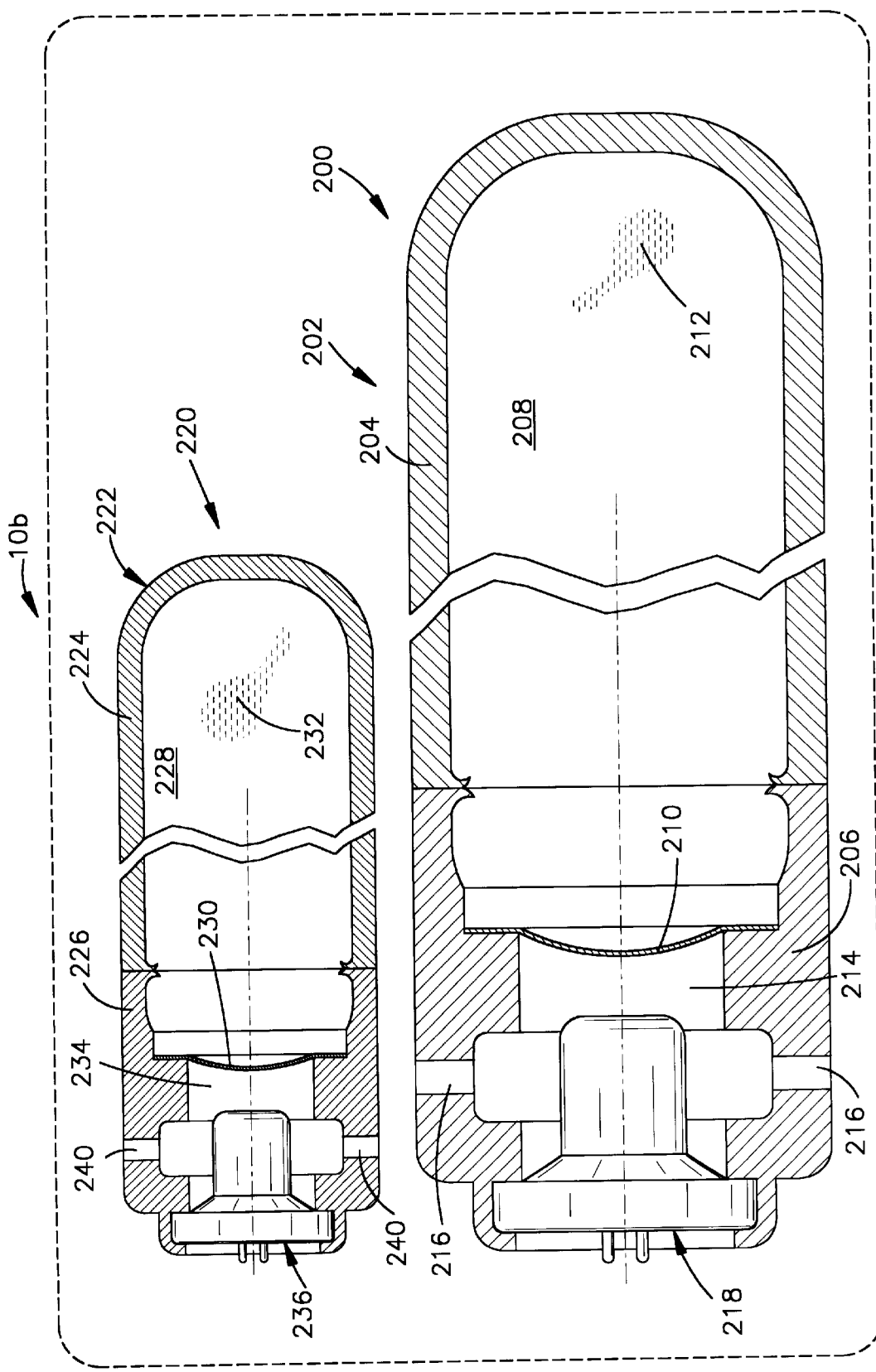
FIG. 4 is a view similar to FIG. 3 of an inflator assembly in accordance with a third embodiment of the present invention.

FIG. 4 illustrates an inflator assembly 10b constructed in accordance with a third embodiment of the present invention. The inflator assembly 10b is similar to the inflator assembly 10 and can be used to inflate a side curtain (not shown) which is similar to the side.

The inflator assembly 10b includes a primary inflator 200 and a secondary inflator 220 which are identical except for fluid volume, pressure and output flow rate. The primary inflator 200 includes a container or housing 202 which has a main body portion 204 and an end cap 206. The inflator housing 202 defines a gas storage chamber 208 which is closed by a rupturable burst disk 210. The gas storage chamber 208 contains a quantity of inflation fluid 212 in the form of compressed gas.

The end cap 206 has a central chamber 214. The burst disk 210 blocks flow of inflation fluid 212 from the gas storage chamber 208 into the central chamber 214. A plurality of outlet passages 216 in the end cap 206 enable flow of inflation fluid 212 from the central chamber 214 when the burst disk 210 is ruptured. Each one of the outlet passages 216 has a cylindrical configuration and is continuously open. An initiator 218 mounted on the end cap 206 projects into the central chamber 214 of the end cap.

The secondary inflator 220 includes a container or housing 222 which includes a main body portion 224 and an end cap 226. The inflator housing 222 defines a gas storage chamber 228 which is closed by a rupturable burst disk 230. The gas storage chamber 228 contains a quantity of inflation fluid 232 in the form of compressed gas. The end cap 226 has a central chamber 234. The burst disk 230 blocks flow of inflation fluid 232 from the gas storage chamber 228 into the central chamber 234. An initiator 236 mounted on the end cap 226 projects into the central chamber 234 of the end cap.

A plurality of outlet passages 240 are formed in the end cap 226 and enable flow of inflation fluid 232 from the central chamber 234. Each one of the outlet passages 240 has a cylindrical configuration and is continuously open. The combined flow area of the outlet passages 240 of the secondary inflator 220 is substantially less than the combined flow area of the outlet passages 216 of the primary inflator 200.

Upon actuation of the inflator assembly 10b, the initiator 218 of the primary inflator 200 is actuated in a known manner and ruptures the burst disk 210. Inflation fluid 212 flows out of the gas storage chamber 208 and into the central chamber 214 in the end cap 206. Inflation fluid 212 immediately begins to flow out of the primary inflator 200 through the outlet passages 216.

As soon as the primary inflator 200 is actuated and its burst disk 210 is ruptured, the pressure in the gas storage chamber 208 begins to drop. After a certain period of time, the pressure is low enough so that the primary inflator 200 is substantially emptied. Because of the relatively large flow area of the outlet passages 216, this typically takes only about twenty milliseconds. The volume and pressure of the inflation fluid 212 are selected to enable filling of the side curtain in this time period.

In the meantime, the secondary inflator 220 is actuated and begins to discharge inflation fluid 232 from the outlet passages 240. Because of the relatively small flow area of the outlet passages 240 in the secondary inflator 220, inflation fluid 232 is discharged from the secondary inflator at a relatively low rate. As a result, the flow of inflation fluid from the secondary inflator 220 to the side curtain (not shown) can persist for from 5 to 10 seconds or more.

The side curtain (not shown) is inflated quickly because of the relatively high pressure and flow rate of the inflation fluid 212 flowing from the primary inflator 200. After this initial rapid flow of the inflation fluid 212 into the side curtain, the inflator assembly 10b continues to supply inflation fluid 232 from the secondary inflator 220 to the side curtain. The secondary inflator 220 discharges fluid only at a rate sufficient to compensate for pressure loss in the side curtain over time through leakage or cooling. Thus, the fluid pressure in the side curtain can be maintained at a desired relatively constant level, allowing the side curtain to remain filled for occupant protection for an extended period of time, in the range of from five to ten seconds or more.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus for helping to protect an occupant of a vehicle having a side structure in the event of a side impact to the vehicle or a vehicle rollover, said safety apparatus comprising:

an inflatable vehicle occupant protection device having a deflated condition and having an inflated condition in which said protection device is inflated between the vehicle occupant and the vehicle side structure; and an inflator assembly for directing inflation fluid for at least five seconds from said inflator assembly into said protection device to inflate said protection device and maintain said protection device in said inflated condition for at least five seconds, said inflator assembly comprising at least one container containing stored inflation fluid under pressure, said inflator assembly being free from pyrotechnic material for generating gas for inflating said protection device.

2. An apparatus as set forth in claim 1 wherein said inflator assembly comprises a first container, an open primary inflation fluid outlet passage for providing inflation fluid from said first container at a high rate of flow to said protection device, and a makeup assembly for providing a relatively slow flow of inflation fluid into said protection device.

3. An apparatus as set forth in claim 2 wherein said makeup assembly comprises a second container containing a quantity of inflation fluid separate from the inflation fluid in said first container.

4. An apparatus as set forth in claim 3 further comprising a movable member for opening said second container and for discharging inflation fluid from said second container.

5. An apparatus as set forth in claim 1 wherein said inflator assembly comprises a first stored gas inflator and a second stored gas inflator which have different output flow rates.

6. An apparatus as set forth in claim 5 wherein said first stored gas inflator comprises means for releasing fluid at a first predetermined flow rate for a first period of time and said second stored gas inflator comprises means for releasing fluid at a second predetermined flow rate for a second predetermined period of time, and wherein said second predetermined flow rate is selected to be a flow rate which is sufficient only to replace pressure lost through leakage from or cooling of said protection device.

7. An inflator assembly as set forth in claim 1 wherein said inflator assembly comprises a secondary source of inflation fluid.

8. An inflator assembly as set forth in claim 7 wherein said inflator assembly comprises a movable member for opening said secondary source of inflation fluid and for discharging fluid from said secondary source of inflation fluid.

9. An inflator assembly as set forth in claim 1 wherein said inflator assembly comprises first and second containers of inflation fluid.

10. An apparatus as defined in claim 1, wherein said inflator assembly directs inflation fluid for at least seven seconds from said inflator assembly into said protection device to inflate said protection device and maintain said protection device in said inflated condition for at least seven seconds.

11. An apparatus as defined in claim 1, wherein said inflator assembly further comprises:

first output means connected with said at least one container for releasing inflation fluid from said inflator assembly at a relatively high rate over a relatively short period of time; and second output means connected with said at least one container for releasing inflation fluid from said inflator assembly at a relatively low rate for a relatively long period of time; and an openable portion for releasing inflation fluid to flow from said container through said first and second output means.

12. An apparatus as defined in claim 11 wherein said relatively long period of time is about five to ten seconds.

13. An apparatus as defined in claim 1 wherein said inflator assembly further comprises means for releasing fluid at a first predetermined flow rate for a first period of time and at a second predetermined flow rate for a second predetermined period of time, and wherein said second predetermined flow rate is selected to be a flow rate which is sufficient only to replace pressure lost through leakage from or cooling of said protection device.

14. An apparatus as defined in claim 1, wherein the side structure of the vehicle includes side windows, said apparatus including a support structure for helping to connect said protection device adjacent the vehicle side structure above the side windows, said support structure comprising a fill tube.

15. An apparatus as defined in claim 1, further comprising a fill tube for delivering said inflation fluid from said inflator assembly to said protection device, said fill tube having a portion located in said protection device.

16. A vehicle occupant safety apparatus for helping to protect an occupant of a vehicle having a side structure including side windows in the event of a side impact to the vehicle or a vehicle rollover, said safety apparatus comprising:

an inflatable vehicle occupant protection device having a deflated condition and having an inflated condition in which said protection device is inflated between the vehicle occupant and the vehicle side structure;

an inflator assembly for providing inflation fluid for at least five seconds to inflate said protection device and maintain said protection device in said inflated condition for at least five seconds, said inflator assembly comprising at least one container containing stored inflation fluid under pressure, said inflator assembly being free from pyrotechnic material for generating gas for inflating said protection device;

a conduit for delivering said inflation fluid from said inflator assembly to said protection device; and a support structure for helping to connect said protection device adjacent the vehicle side structure above the side windows, said support structure comprising a fill tube for delivering said inflation fluid from said inflator assembly to said protection device, said fill tube having a portion located in said protection device.

17. A stored gas inflator assembly actuatable to direct inflation fluid into an inflatable vehicle occupant protection device for an extended period of time, said inflator assembly comprising:

a container for containing inflation fluid under pressure;

first output means connected with said container for releasing inflation fluid from said inflator assembly at a relatively high rate over a relatively short period of time; and second output means connected with said container for releasing inflation fluid from said inflator assembly at a relatively low rate over a relatively long period of time; and a single openable portion connected with said container for releasing inflation fluid to flow from said container to said first and second output means.

18. An inflator assembly as defined in claim 17 wherein said first output means comprises a first outlet passage and a valve assembly for controlling fluid flow through said first outlet passage.

19. An inflator assembly as defined in claim 18 wherein said valve assembly is operable to enable fluid flow through said first outlet passage only when the pressure in said container is above a predetermined pressure.

20. An inflator assembly as defined in claim 19 wherein said second output means comprises a second outlet passage which is continuously open.

21. An inflator assembly as defined in claim 18, wherein said valve assembly comprises a valve member and a spring that biases said valve member against a valve seat to block inflation fluid flow through said first outlet passage.

22. An inflator assembly as defined in claim 17, wherein said single openable portion comprises a single burst disk that is rupturable to release said inflation fluid from said container.

23. An inflator assembly as defined in claim 22, further comprising a single initiator that is actuatable to rupture said burst disk.

24. An inflator assembly as defined in claim 17, wherein said inflator assembly is free from pyrotechnic material for generating inflation fluid.

25. A vehicle occupant safety apparatus for helping to protect an occupant of a vehicle having a side structure in the event of a side impact to the vehicle or a vehicle rollover, said safety apparatus comprising:

an inflatable vehicle occupant protection device having a deflated condition and having an inflated condition in which said protection device is inflated between the vehicle occupant and the vehicle side structure; and an inflator assembly for providing inflation fluid for at least five seconds to inflate said protection device, said inflator assembly including a single container containing inflation fluid under pressure, said container having a single burst disk rupturable to release inflation fluid to flow out of said container, said inflator assembly being free from pyrotechnic material for generating gas for inflating said protection device.

26. Apparatus as defined in claim 25, further comprising first output means connected with said container for releasing inflation fluid from said inflator assembly at a relatively high rate over a relatively short period of time when said burst disk is ruptured; and second output means connected with said container for releasing inflation fluid from said inflator assembly at a relatively low rate over a relatively long period of time when said burst disk is ruptured.

27. Apparatus as defined in claim 26, wherein said relatively long period of time is at least five seconds.

28. A stored gas inflator assembly actuatable to direct inflation fluid into an inflatable vehicle occupant protection device for an extended period of time, said inflator assembly comprising:

a container for containing inflation fluid under pressure;

first output means connected with said container for releasing inflation fluid from said inflator assembly at a relatively high rate; and second output means connects with said container for releasing inflation fluid from said inflator assembly at a relatively low rate, said inflation fluid being released to flow through said first and second output means when an openable portion is opened, said first output means closing to block flow of said inflation fluid through said first output means when inflation fluid pressure in said container drops below a predetermined level, said inflation fluid continuing to flow through said second output means after said inflation fluid pressure in said container drops below said predetermined level.

29. An inflator assembly as defined in claim 28 wherein said first output means comprises a first outlet passage and a valve assembly for controlling fluid flow through said first outlet passage.

30. Apparatus as defined in claim 29, wherein said valve assembly comprises a valve member and a spring that biases said valve member against a valve seat to block inflation fluid flow through said first outlet passage.

31. An inflator assembly as defined in claim 29 wherein said second output means comprises a second outlet passage which is continuously open.

32. Apparatus as defined in claim 29, further comprising a single burst disk that is rupturable to release said inflation fluid from said container to flow through said first and second outlet means.

* * * * *

UNITED STATES PATENT AND TRADEMARK OFFICE
CERTIFICATE OF CORRECTION

PATENT NO.   : 6,227,562 B1
DATED        : May 8, 2001
INVENTOR(S)  : Bryan W. Shirk et al.

It is certified that error appears in the above-identified patent and that said Letters Patent is hereby corrected as shown below:

<u>Column 10,</u>
Line 53, change "29" to -- 28 --.

Signed and Sealed this

Twelfth Day of November, 2002

Attest:

Attesting Officer

JAMES E. ROGAN
*Director of the United States Patent and Trademark Office*